US 6,526,782 B1

(12) United States Patent
Mossadegh et al.

(10) Patent No.: US 6,526,782 B1
(45) Date of Patent: Mar. 4, 2003

(54) MULTI HEATING ZONE APPARATUS AND PROCESS FOR MAKING CORE/CLAD GLASS FIBERS

(75) Inventors: Reza Mossadegh, Alexandria, VA (US); Brian Cole, Arlington, VA (US); Pablo Pureza, Burke, VA (US); Jasbinder Sanghera, Ashburn, VA (US); Shyam Bayya, Ashburn, VA (US); Ishwar Aggarwal, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/964,548

(22) Filed: Sep. 28, 2001

(51) Int. Cl.[7] .......................... C03B 37/022; C03B 37/07
(52) U.S. Cl. .............................. 65/488; 65/405; 65/502; 65/495; 65/484; 65/384
(58) Field of Search .......................... 65/405, 495, 502, 65/488, 484, 384

(56) References Cited

U.S. PATENT DOCUMENTS

| | | | |
|---|---|---|---|
| 4,259,100 A | * | 3/1981 | Aulich et al. ................. 65/502 |
| 5,879,426 A | | 3/1999 | Sanghera et al. |
| 5,900,036 A | | 5/1999 | Mossadegh et al. |
| 6,021,649 A | | 2/2000 | Sanghera et al. |
| 6,062,047 A | * | 5/2000 | Fredholm et al. ............. 65/488 |
| 6,128,429 A | | 10/2000 | Cole et al. |
| 6,145,342 A | | 11/2000 | Bayya et al. |
| 6,250,112 B1 | * | 6/2001 | Kerdoncuff .................. 65/379 |

* cited by examiner

Primary Examiner—James Derrington
(74) Attorney, Agent, or Firm—John J. Karasek; George A. Kap

(57) ABSTRACT

This invention pertains to apparatus and process for making core/clad glass fibers. The apparatus includes a central tube or receptacle connected at the top to a pressure controller and terminating in a reduced section; a side tube or receptacle positioned at about the level of the upper portion of the central tube; an outer tube or receptacle disposed around the bottom portion of the central tube terminating in a smaller section which is concentric with and spaced directly below the section of the central tube; a side arm connecting the side tube and the outer tube; and furnaces around the side, outer, and the reduced sections of the central and the outer tubes. The process includes the steps of disposing a solid core glass rod at a point removed from hot temperature that can cause crystallization in the core glass rod, disposing a solid clad glass rod at a point removed from the core glass rod, softening to the flowing condition the solid clad glass rod, transferring the softened clad glass to a lower point, the softened clad glass having a central void therethrough, heating the softened clad glass above its crystallization temperature, cooling the softened clad glass to a draw temperature, transferring the solid core glass rod into the central void in the softened clad glass, softening to the flowing condition the solid core glass rod with the heat from the softened and cooled clad glass, and drawing the core/clad glass fiber by allowing the clad and core glasses to flow in the form of a fiber.

12 Claims, 4 Drawing Sheets

MULTI HEATING ZONE APPARATUS AND PROCESS FOR MAKING CORE/CLAD GLASS FIBERS

BACKGROUND OF THE INVENTION

1. Field of the Invention

This invention pertains to a multiple heating zone process and apparatus for fabricating core/clad optical glass fibers, particularly from thermally unstable glass.

2. Description of Related Art

Although this discussion will focus on the chalcogenide glasses, it should be understood that this invention pertains to other glasses as well, including oxide and fluoride glasses, which are thermally unstable in that crystallization occurs during fiber fabrication thereof during cooling of the core to the draw temperature through the crystallization temperature.

Silica glass has phonon energy of about 1100 $cm^{-1}$, fluoride glass has phonon energy of about 560 $cm^{-1}$, and chalcogenide glass has phonon energy of about 425 $cm^{-1}$ and lower. It is chalcogenide glass that is often used to make glass fibers for infrared applications, due to its low phonon energy and its spectral range of 2–12 microns.

Chalcogenide glasses and optical fibers made therefrom can transmit light in the 2–12 micron region, depending upon their composition. Chalcogenide glasses are made of at least one chalcogen element, i.e., sulfur (S), selenium (Se), tellurium (Te), and at least one other element such as arsenic (As), germanium (Ge), gallium (Ga), antimony (Sb), indium (In), cadmium (Cd), etc. Many applications are associated with these glasses and optical fibers, such as high power laser delivery, laser surgery, medical diagnostics, remote chemical sensing, near field microscopy, infrared imaging, etc. In addition, because the phonon energy of these glasses is lower than oxide and fluoride glasses, chalcogenide glasses have been considered as host materials for rare earth doped optical fiber lasers and fiber amplifiers, operating in the IR region. For fiber lasers and fiber amplifiers, the core glass should contain sufficient amount of at least one rare earth element, such as praseodymium (Pr), neodymium (Nd), dysprosium (Dy), etc., to make optical devices. Unfortunately, rare earth elements are not soluble in most stable chalcogenide glasses, such as arsenic sulfide ($As_{40}S_{60}$) or arsenic selenide ($As_{40}Se_{60}$). Other chalcogenide glasses, such as gallium-containing sulfide or selenide glasses that can dissolve sufficient amount of rare earth elements, are not thermally stable and have a tendency to crystallize during the fiber drawing process. Therefore, a fiber drawing technique is needed to enable fabrication of rare earth doped, core/clad optical fibers made, from chalcogenide and other glasses by maintaining the core at a temperature below its crystallization temperature $T_x$.

High quality, low loss chalcogenide optical fibers are needed for the applications mentioned above. The main sources for scattering optical loss are impurity particles in the glass itself and formation of crystals, bubbles, or core/clad interface defects during the fiber fabrication process. U.S. Pat. No. 5,879,426 explains the double crucible process for making chalcogenide optical fibers. That process is suitable for thermally stable chalcogenide glasses such as, arsenic sulfide and arsenic selenide glasses, that do not crystallize during the re-melting and subsequent cooling to the fiber drawing temperature Td . Arsenic sulfide fibers drawn from that process have shown a minimum loss of 0.1 dB/m. Using that technique for fabricating optical fibers from less thermally stable chalcogenide glasses, such as GeGaAsS or GeGaAsSe, especially when these glasses are doped with rare earth elements, is not possible because they will crystallize during the slow cooling process from their melting temperature to the drawing temperature. Therefore, a unique process and apparatus are needed to overcome the crystallization problem capable of fabricating core/clad glass fibers while maintaining the temperature of the core glass below its crystallization temperature.

OBJECTS AND BRIEF SUMMARY OF THE INVENTION

An object of this invention is a process and apparatus for fabricating core/clad glass fibers from thermally unstable glass.

Another object of this invention is an apparatus for fabricating core/clad glass fibers wherein the core glass is exposed to temperatures below the crystallization temperature of the core glass.

Another object of this invention is a process for making core/clad glass fibers from thermally unstable chalcogenide glass.

Another object of this invention is a process for fabricating core/clad glass fibers wherein the core glass is subjected to a drawing temperature that is below its crystallization temperature thus avoiding higher temperatures at which crystallization may take place.

These and other objects of this invention are attained by fabricating the core/clad glass fiber by separately treating the core and clad glass until prior to the drawing of the fiber whereby only the clad glass is exposed to temperature above the clad glass crystallization temperature.

DETAILED DESCRIPTION OF THE INVENTION

The invention relates to a dual, high-low temperature process and apparatus to fabricate single-mode and multi-mode core/clad optical fibers from core and cladding glass rods at a temperature above their glass transition temperature $T_g$ and below their crystallization temperature $T_x$. This technique is in particular useful for making optical fibers from a thermally unstable rare earth doped glass.

Gallium and rare earth elements typically destabilize glass leading to crystallization and increased loss in the fiber. The obvious approach is to avoid the use of gallium and rare earth elements in the glass and this is done at times. However, some applications require the presence of gallium and/or rare earth elements, or the presence of gallium and/or rare earth elements in the glass is desired for some reason. In instances when a rare earth element and/or gallium is present, fabrication of the glass containing a rare earth or gallium must be carried out in a way that avoids exposure of the glass to temperature that results in crystallization so as not to add additional loss. This can be achieved using the apparatus and/or process of this invention where the core glass temperature is well below the crystallization temperature.

It should be understood that it is the core in a core/clad fiber that is doped with at least one rare earth element. Insolubility of rare earth elements in some glasses is well recognized as its cause of crystallization and consequent negative effect on loss. Therefore, if the core glass contains gallium and/or rare earth element(s), the core glass should be kept from high temperature which can cause crystallization therein in addition to the insolubilization problem.

Figure 1:
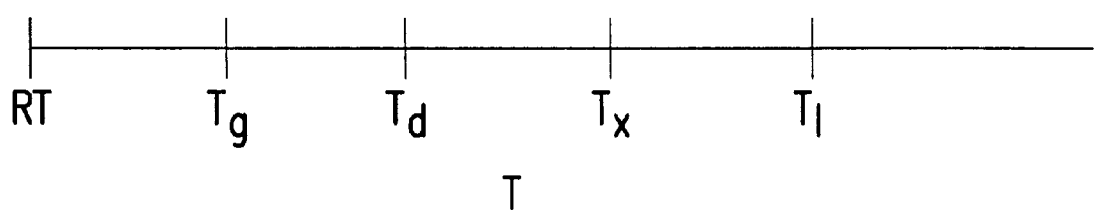
FIG. 1 is a plot showing relative disposition of the various glass temperatures starting at room temperature (RT), at which the core and clad glasses are solid, and rising to liquidus temperature $T_1$ at which the core and clad glasses are liquid.

Before proceeding to the apparatus and process, FIG. 1 demonstrates typical relative disposition of the various temperatures that the core and/or clad glasses may experience. FIG. 1 starts at the left hand portion of the plot where room temperature (RT) is shown, followed in ascending order by glass transition temperature ($T_g$), fiber draw temperature ($T_d$), crystallization temperature ($T_x$), and liquidus temperature ($T_l$), or $RT<T_g<T_d<T_x<T_{l_-}$. At draw temperature $T_d$, glass is softened to the point of being in a flowing condition but well below the crystallization temperature $T_x$ and the liquidus temperature $T_l$. So, by carrying the operation below the crystallization temperature $T_x$, formation of crystals and occlusions, including bubbles, can be avoided and the glass can have a lower loss.

Figure 2:
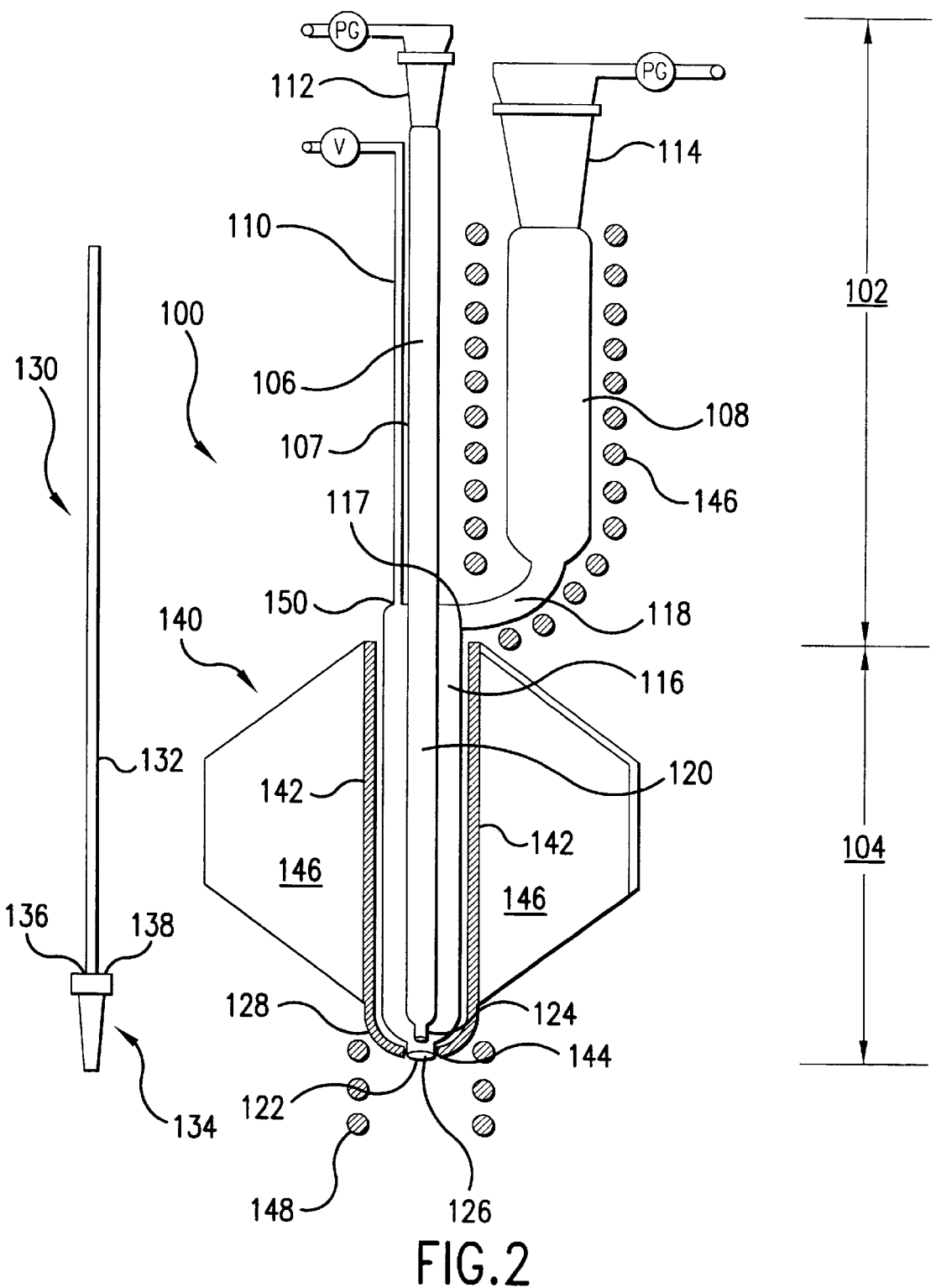
FIG. 2 is the apparatus in cross-section showing the many features thereof with the upper or side heater disposed around the side tube.

FIG. 2 shows the apparatus in cross-section, which apparatus can be used to fabricate a core/clad glass fiber from thermally unstable glass or any other glass. Referring to the apparatus of FIG. 2, apparatus 100 is typically constructed of quartz, although it can be made of steel or any other material, and consists of upper section 102 and lower section 104 and the doping element is praseodymium at 550 ppm and the clad glass is $Ge_{19.5}As_{18.0}Se_{60.0}S_{2.5}$. The upper section 102 includes upper portion 106 of central tube 107, side tube 108 and optional vent tube 110. The central tube 107 extends to the bottom of the lower section 104 and terminates at the top 112 with a ground glass joint that is connected to a pressure controller and inert or reactive gas source. The side tube 108 similarly terminates at the top 114 with a ground glass joint, pressure controller and is connected at the bottom thereof to the outer tube 116 of the lower section 104 by side arm 118. The side arm 118 is fused to the outer tube 116 at point 117. The vent tube 110 is fused to the outer tube 116 at point 150, which is typically at about the same vertical level as the side arm 118. The vent tube 110 extends vertically from point 150 and is typically of a smaller internal diameter than the central tube 107, with which it is typically parallel.

The lower section 104 of the apparatus 100 consists of the lower portion 120 of the central tube 107, which is the lower extension of the upper portion of central tube 107, and outer tube 116 that is fused to the upper section's side tube 108 by side arm 118. The central tube 107 is concentrically disposed within or inside of the outer tube 116 and both the central and outer tubes terminate with smaller circular orifices at their lower extremities. Circular orifices produce circular fibers, although other shapes can be used. The central tube 107 terminates at its lower extremity with orifice 122 which is connected to the central tube 107 by section 124 of reduced cross-sectional as compared to the central tube 107. The outer tube 116 terminates at its lower extremity with orifice 126 which is connected to the outer tube 116 by section 128 of reduced cross-sectional area compared to the outer tube 116. Orifice 124 of central tube 107 is disposed concentrically within and slightly above the orifice 126 of the outer tube 116.

Figure 3C:
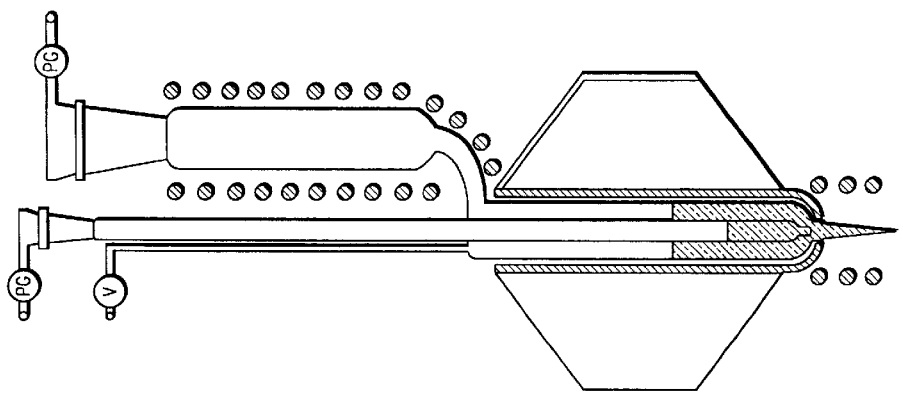
FIG. 3(c) shows the apparatus in its final stage with the core and clad glasses in softened flowing states disposed at lower portions of the central and outer tubes, with the resistance heater on and commencement of the fiber drawing operation.
Figure 3B:
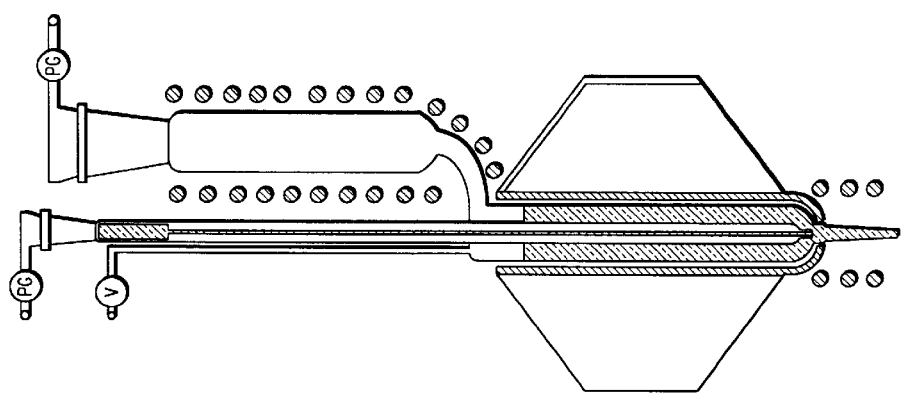
FIG. 3(b) shows the apparatus in its intermediate stage with the solid core glass rod disposed at the upper extremity of the central tube and the clad glass rod, now in softened flowing state, disposed in the outer tube around the lower portion of the central tube.
Figure 3A:
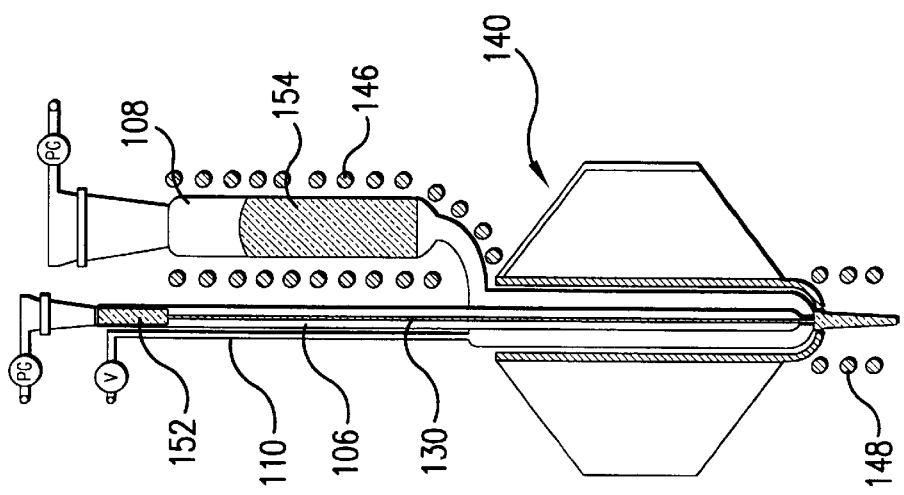
FIG. 3(a) shows the apparatus in its initial stage with the solid core glass rod disposed at the upper extremity of the central tube and the solid clad glass rod disposed in the side tube.
Figure 4:
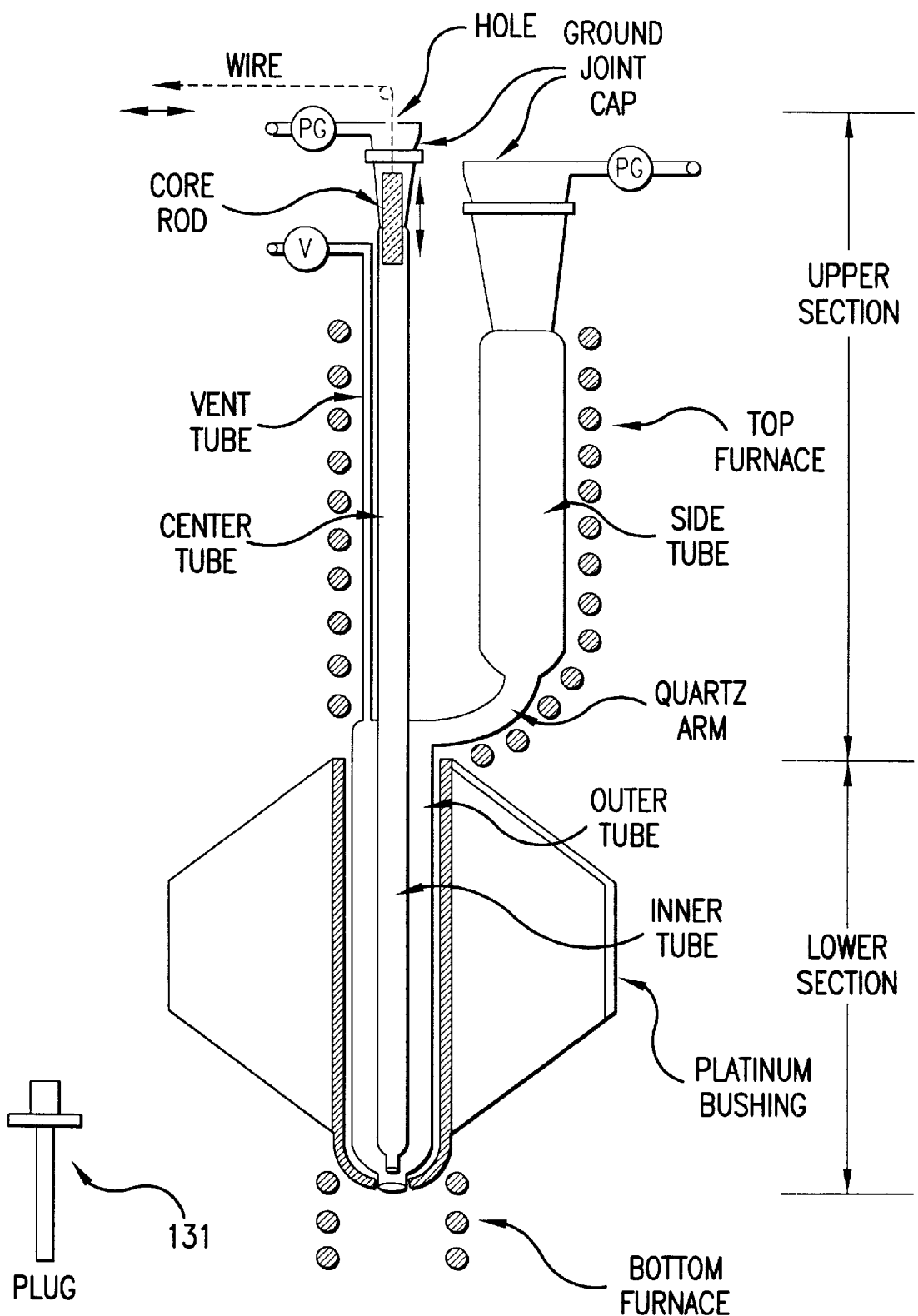
FIG. 4 is the apparatus in cross-section showing suspension of the solid core rod by means of a wire from the top. In this embodiment, the plug is shorter than the one used in FIG. 2 and the upper heater is disposed around the central tube, the side tube and the vent tube.

The apparatus 100 includes a long quartz or stainless steel plug 130 that inserts from the bottom of the apparatus 100 into the central tube 107 and terminates at the top some distance from the upper termination point of the central tube 107 in order to accommodate a core glass rod at its upper extremity within the central tube, as shown in the embodiment depicted by FIGS. 3(a) and 3(b). In that embodiment, the plug holds the core glass rod at the top of the central tube 107 and far away from the heat zone during transfer, re-melting and quenching of the clad glass. In another embodiment, the core glass rod can be suspended from the top within the central tube, in which case, the long plug is dispensed with and replaced with a short plug 131, as shown in FIG. 4. The diameter of the stem 132 of plug 130 limits the size of orifice 126 because stem 132 cannot be made smaller that about 1.5 mm in diameter and this places a limitation on the fiber core size for single mode fibers. This limitation is lifted using the apparatus shown in FIG. 4.

Further to what is disclosed in the previous paragraph, plug 130 includes stem 132 and bushing 134 attached to the stem at point 136. Surface 138 is circular or can be conical, or any other shape, and contacts orifice 126 of the outer tube 116 when the plug 130 is in operational disposition disposed inside the central tube 107 to prevent softened and flowing cladding glass from flowing through orifice 126. Diameter of the stem 132 of the plug 130 is such that, when disposed within the lower portion of the central tube 107, is sufficient to prevent the softened flowing core glass from flowing through orifice 122. This means that diameter of the stem 132 is typically a fraction of a millimeter smaller than diameter of the central section 124 of the central tube 107, assuming circular cross-sections of the apparatus components.

Surrounding the outer tube 116 at the lower portion of the apparatus 100 is outer heating bushing 140 consisting of a cylindrical well 142 that is usually about 3 mm thick with opening 144 to loosely accommodate section 128 of the outer tube 116. Nearly the entire lower section 104 of the apparatus and below side arm 118 of the apparatus 100 is loosely disposed inside the well 142. The gap between the outer tube and the well 142 is usually less than about 1 mm. Metal wings 146 are attached to the well 142 for dissipation of heat. Typically, the two diametrically opposed platinum wings are secured to the well, with each wing typically being a parallelogram with the longer side secured to the well and the shorter side disposed about 60 mm away. Thickness of the wings is typically a couple of millimeters.

Outer heating bushing 140 is heated by passing electric current through it and is especially useful here since it can be heated and cooled very quickly in a couple of minutes. Resistance side furnace 146 is provided around the side tube 108 in the upper section 102 of the apparatus 100 to heat the clad glass for transferring softened and flowing clad glass to the outer tube 116 of the lower section 104 of the apparatus 100. Another orifice resistance furnace 148 is located underneath of the outer heating bushing 140 to prevent the core and clad glass from freezing at the orifices 122,126 of the central and outer tubes 107, 116 of the apparatus during fiber drawing operation. Orifice furnace 148 is optional since it can be combined with outer furnace 142 to provide the necessary heat.

Vent tube 150 is optional and extends vertically from the upper portion of the outer tube 116 and is generally parallel to the central tube 107.

FIGS. 3(a), 3(b) and 3(c) illustrate the steps in this inventive process for fabrication of core/clad optical fibers. FIG. 3(a) shows the solid core and solid cladding chalcogenide glass rods 152, 154, respectively, are placed into the central and side tubes 107, 108, respectively. The plug 130 is inserted from the bottom of the apparatus thus closing the central and outer tube orifices 122, 126, holding the core glass rod at the top of the central tube and out of the heating zones. The central and side tubes are connected individually to pressure controllers and gas sources. The vent tube is connected to a valve and exhaust system. In this step, the core and cladding glass rods are purged with an inert gas, such as nitrogen, argon, or a reactive gas, such as chlorine. The vent tube valve is opened and the temperature of the top or side furnace 146 and bushing outer furnace 140 is set to a temperature above the softening temperature of the cladding glass, typically around 400–600° C. When the cladding glass becomes fluid and comes into contact with the side tube, gas pressure will build up above the cladding glass and cause it to flow from the side tube 108 into the outer tube 116 of the lower section. The vent tube 110 is provided for the replacement gas to escape and prevent formation of the trapped gas in the outer tube and, consequently, formation of bubbles in the fiber. The transfer of the clad glass from side tube 108 to outer tube 116 also serves to indicate when the clad transfer has been completed since the chamber will no longer hold pressure.

When all the cladding glass is transferred into the lower section , as shown in FIG. 3(b), the side furnace 146 is turned off, the temperature of the bottom furnace 148 is set close to the drawing temperature and the outer bushing temperature is raised to a temperature above the liquidus temperature of the cladding glass, typically 650–850° C., to melt any crystals therein. At this stage, the softened clad glass is free of any crystals and is cooled or quenched quickly to the drawing temperature, in less than a minute or longer, as desired, by setting the outer bushing temperature at the draw temperature. When the cladding glass temperature reaches the drawing temperature, the plug 130 is removed thereby lowering the core rod to the bottom of the central tube 107. At this temperature, the core glass softens at a temperature that is well below its crystallization temperature. The core and cladding glasses exit the central and outer orifices as the fiber drawing starts, as shown in FIG. 3(c). The core and cladding diameters of the fiber can be controlled by adjusting the gas pressure above the core and cladding glasses individually, by modifying the central and outer tube orifice sizes, or by changing the draw temperature and drawing rate.

Having described the invention, the following examples are given as particular embodiments thereof and to demonstrate the practice and advantages thereof. It is understood that the examples are given by way of illustration and are not intended to limit the specification or the claims in any manner.

In the examples that follow, the apparatus of FIG. 2 was quartz and was used, with some, modifications that will be described. In the apparatus illustrated in FIG. 2, vertical extent of the apparatus 100 was about 225 mm (9"), the upper section 102 was about 106 mm (4¼") and the lower section 104 was about 118 mm (4¾"). Center tube 106 and inner tube 120, together combine to form the central tube 107 that is 225 mm long and 1.5 mm wall thickness, terminating at the lower extremity with section 124 that is 5 mm long and 1.5 mm wall thickness. Orifice 122 was 1.5 mm in internal diameter. Side tube 108 in the upper section 102 of the apparatus 100 was about 75 mm long and 1.5 mm thick. Side arm 118 was a tube of short extent, 7 mm internal diameter and 1.0 mm thick. The outer tube 116 was about 100 mm long, 3 mm internal diameter and 1.5 mm wall thickness. Orifice 126 was about 7 mm in diameter. Section 144 was 4 mm long and 1.5 mm wall thickness. Orifice 122 was concentrically directly above orifice 126 and the vertical spacing therebetween was 1 mm. The vent tube 110 was about 1 mm in internal diameter, 1.5 mm wall thickness and about 100 mm in vertical extent. Stem 132 of the plug 130 was approximately 200 mm and its lower portion was 75 mm. Surface 138 of the plug 130 was about 10 mm in diameter.

EXAMPLE 1

This example demonstrates the use of apparatus of FIG. 2 in fabricating glass fiber that had a core diameter of 95 microns and an overall diameter of 250 microns. The core glass rod in cylindrical form measuring 6 mm diameter by 36 mm in length had composition of $Ge_{19.75}As_{17.5}Ga_{0.5}Se_{62.72}$ and its liquidus temperature was $(T_l)$ about 725° C., its glass transition temperature $(T_g)$ was 261° C., and its crystallization temperature $(T_x)$ was 547° C. The core glass was doped with 550 ppm praseodymium $(Pr^{+3})$. The cladding glass rod cylinder was 15 mm in diameter and 50 mm long and had composition of $Ge_{19.5}As_{18.0}Se_{60.0}S_{2.5}$ and its $T_l$ was about 725° C., its $T_g$ was 260° C., and its $T_x$ was not observed.

The core and cladding rods 152 and 154 were positioned in the central tube 106 (107) from the top through opening 112 and the side tube 108 through opening 114. The apparatus was sealed at the top by the ground glass joints and placed into the platinum bushing. The top and bottom resistance furnaces were positioned accordingly. The central and side tubes were connected to a nitrogen gas supply and the vent tube. was connected to an exhaust system. The long quartz plug was inserted into the bottom orifice of the apparatus that held the core glass rod at the top of the central tube and closed the central and outer tube orifices to prevent leakage of the cladding glass during the process, as shown in FIG. 3(a). After purging the apparatus and glasses with dry nitrogen gas for about ½ hour, the side furnace 146 and platinum bushing or outer furnace temperatures were set at 600° C. and the orifice furnace 148 was set at temperature of 480° C. The cladding glass became fluid and flowed into outer tube 148 of the bottom section of the apparatus under slight pressure of about 2 inches of water while the core glass rod remained solid. When all the cladding glass was transferred into the lower section of the apparatus, the side furnace 146 was shut down and the bushing or outer furnace 140 temperature was raised to 700° C. for two minutes and then to 725° C., above the liquidus temperature of the glass, for three minutes. The outer furnace temperature was then set at 460° C. and allowed the cladding glass to quench down quickly in a couple of minutes to that temperature. The plug was removed to lower the core rod to the bottom of the central tube and it took two minutes for the core glass rod to soften to flowing condition. The vent tube valve was closed and the gas pressure above the core and cladding glasses rose to 0.6 psi and 0.2 psi, respectively. The core and cladding glasses exited through the orifices. Initially, a bead dropped and fiber drawing started at a rate of 3 meters per minute and continuously collected on a spool.

EXAMPLE 2

In order to fabricate single-mode fibers, the fiber drawing conditions of Ex. 1 were changed as follows: the pressure above the core glass was reduced to one inch of water, the pressure above the cladding glass was raised to two psi, and the drawing speed increased to 15 m/min. The resulting fiber had a core diameter of 7 microns and overall diameter of 80 microns.

EXAMPLE 3

Procedure of Ex. 1 was followed in fabricating single mode glass fiber of core diameter of 4 microns and overall diameter of in excess 125 microns. Fabrication of the single mode fiber of core diameter of 4 microns was made possible by a modification to the apparatus, as shown in FIG. 4, which involved replacing plug 130 with a much shorter plug to block orifices 122, 126 and suspending the core glass rod from the top by means of a wire secured to a notch in the core glass rod. The wire was threaded through a cap disposed at the upper extremity of the center tube.

While presently preferred embodiments have been shown of the novel process and apparatus for fabricating core/clad glass fibers from thermally unstable glass, and of the several modification discussed, persons skilled in this art will readily appreciate that various additional changes and modifications may be made without departing from the spirit of the invention as defined and differentiated by the following claims.

What is claimed is:

1. An apparatus comprising:
    (a) a central receptacle terminating at its lower extremity in a central orifice that is of a reduced cross-sectional area and having a pressure controller attached to said central receptacle at its upper portion,
    (b) a side receptacle having a pressure controller at its upper portion and open at is lower portion,
    (c) an outer receptacle disposed around the lower portion of said central receptacle, said outer receptacle being in communication with said side receptacle and having at its lower extremity an orifice that is aligned with said central receptacle orifice, said central receptacle orifice is of a smaller cross-sectional area than said outer receptacle orifice,
    (d) a side furnace disposed in the vicinity of said side receptacle with a controller for controlling temperature of said side receptacle,
    (e) an outer furnace in the vicinity of said outer receptacle and said orifices with a controller for controlling temperature of said outer receptacle and said orifices,
    (f) a nesting portion disposed within and at the upper portion of said central receptacle for disposing glass core rod outside of said side and outer furnaces, and
    (g) a plug for closing said orifices.

2. The apparatus of claim 1 wherein said central orifice is spaced above said outer orifice.

3. The apparatus of claim 2 wherein said side furnace is disposed around said side receptacle, said outer furnace is disposed around said outer receptacle, the apparatus including an orifice furnace disposed around said orifices.

4. The apparatus of claim 3 wherein said central receptacle terminates at its lower portion with a central section of reduced cross-sectional area that forms said central orifice and said outer receptacle terminates at its lower portion with an outer section of reduced cross-sectional area that forms said outer orifice.

5. The apparatus of claim 4 wherein said plug includes a stem, a closure structure of larger cross-sectional area than said stem, and a lower portion, wherein cross-sectional area of said stem about equals cross-sectional area of said central orifice but is smaller to allow said stem to enter said central orifice to prevent passage of a liquid between said stem and said central orifice when said stem is disposed within said central receptacle and wherein said closure structure abuts said outer orifice.

6. The apparatus of claim 5 wherein said central, side, and outer receptacles are tubular and wherein internal diameter of said central receptacle is smaller than that of said side and outer receptacles.

7. The apparatus of claim 6 including a side arm connecting said side receptacle and said outer receptacle, said side receptacle is disposed above said outer receptacle to allow for gravity flow from said side receptacle to said outer receptacle.

8. The apparatus of claim 7 wherein said side furnace includes a metal well in the form of a tube with an opening through its bottom portion through which projects said side section of said side receptacle, said apparatus including a vent receptacle attached to the upper portion of said outer receptacle and being in communication therewith.

9. The apparatus of claim 8 wherein said central receptacle, said side receptacle, said outer receptacle, and said vent receptacle are vertically disposed in a parallel arrangement.

10. The apparatus of claim 9 wherein length of said central receptacle is greater than the sum length of said side receptacle and said outer receptacle, and said side arm is tubular and is disposed at a level of about the mid point of said central receptacle.

11. The apparatus of claim 10 wherein length of said stem of said plug extends beyond the vertical level where said vent receptacle is connected to said outer receptacle, when in operation, the vertical level where said vent receptacle is connected to said outer receptacle is above the vertical extent of said outer furnace.

12. The apparatus of claim 10 including a cap for closing-off said central receptacle at its upper portion and an opening in said cap for threading a wire therethrough.

* * * * *